US011409529B2

(12) United States Patent
Lee et al.

(10) Patent No.: US 11,409,529 B2
(45) Date of Patent: Aug. 9, 2022

(54) RISC-V IMPLEMENTED PROCESSOR WITH HARDWARE ACCELERATION SUPPORTING USER DEFINED INSTRUCTION SET AND METHOD THEREOF

(71) Applicant: ZARAM TECHNOLOGY CO., LTD., Seongnam-si (KR)

(72) Inventors: Tae Jong Lee, Seongnam-si (KR); Sung Hoon Park, Yongin-si (KR); In Shik Seo, Seoul (KR); Joon Hyun Baek, Seongnam-si (KR)

(73) Assignee: ZARAM TECHNOLOGY CO., LTD., Seongnam-si (KR)

( * ) Notice: Subject to any disclaimer, the term of this patent is extended or adjusted under 35 U.S.C. 154(b) by 0 days.

(21) Appl. No.: 17/041,384

(22) PCT Filed: Oct. 4, 2019

(86) PCT No.: PCT/KR2019/013045
§ 371 (c)(1),
(2) Date: Sep. 24, 2020

(87) PCT Pub. No.: WO2020/138663
PCT Pub. Date: Jul. 2, 2020

(65) Prior Publication Data
US 2021/0365266 A1 Nov. 25, 2021

(30) Foreign Application Priority Data
Dec. 26, 2018 (KR) .......................... 10-2018-0169301

(51) Int. Cl.
*G06F 9/30* (2018.01)
*G06F 1/08* (2006.01)
*G06F 9/38* (2018.01)

(52) U.S. Cl.
CPC ............ *G06F 9/30145* (2013.01); *G06F 1/08* (2013.01); *G06F 9/30079* (2013.01); *G06F 9/3802* (2013.01); *G06F 9/3822* (2013.01)

(58) Field of Classification Search
CPC .. G06F 9/3802; G06F 9/3822; G06F 9/30079; G06F 9/30145
See application file for complete search history.

(56) References Cited

U.S. PATENT DOCUMENTS

2017/0220499 A1* 8/2017 Gray ........................ G06F 13/36
2019/0158428 A1* 5/2019 Gray ..................... G06F 9/45558
2019/0303165 A1* 10/2019 Brewer .................. G06F 9/3012

FOREIGN PATENT DOCUMENTS

KR     10-0781340 B1     11/2007

OTHER PUBLICATIONS

Ho-Cheung NG et al., "A Soft Processor Overlay with Tightly-coupled FPGA Accelerator," 2nd International Workshop an Overlay Architectures for FPGAs (OLAF2016), Jun. 21, 2016, pp. 31-36.

* cited by examiner

*Primary Examiner* — Corey S Faherty
(74) *Attorney, Agent, or Firm* — Rabin & Berdo, P.C.

(57) ABSTRACT

The present invention relates to a hardware high-speed computation combined RISC-V based computation device for supporting a user-defined instruction set and a method thereof which configures a hardware high-speed computation unit executing a user-defined function through a field programmable gate array (FPGA) in a single chip together with a RISC-V based computation device, executes general computation and user-defined computation in an instruction level, not a separate bus connection configuration, through a program using a RISC-V based instruction set including a user-defined instruction set, and provides flexibility capable of optionally changing the user-defined instruction set and a corresponding function and a method thereof.

10 Claims, 12 Drawing Sheets

RISC-V IMPLEMENTED PROCESSOR WITH HARDWARE ACCELERATION SUPPORTING USER DEFINED INSTRUCTION SET AND METHOD THEREOF

FIELD OF THE INVENTION

The present invention relates to a hardware high-speed computation combined RISC-V based computation device for supporting a user-defined instruction set and a method thereof, and particularly, to a hardware high-speed computation combined RISC-V based computation device for supporting a user-defined instruction set and a method thereof which configures a hardware high-speed computation unit executing a user-defined function through a field programmable gate array (FPGA) in a single chip together with a RISC-V based computation device, executes general computation and user-defined computation in an instruction level, not a separate bus connection configuration, through a program using a RISC-V based instruction set including a user-defined instruction set, and provides flexibility capable of optionally changing the user-defined instruction set and a corresponding function and a method thereof.

BACKGROUND ART

An RISC-V computation device has an off-source instruction set architecture (ISA) using a reduced instruction set computing (RISC) method, and is open for free use unlike other similar commercial central processing units (CPUs).

Such an RISC-V ISA structure may design a compatible or derived central processing unit freely and may be commercially used, and there is no obligation to disclose such a derived design.

In particular, RISC-V provides high performance and economic efficiency by significantly reducing the area of a chip and reducing power consumption to less than half while providing similar performance compared to similar commercial computing devices. However, it is an early situation to completely replace the commercial processor in that the design of the graphics hardware core (GPU) is still incomplete, and development of driver software for various interlocking is required.

However, it is not only a special purpose, but also requires high-speed computation or provides sufficient performance for the purpose of controlling equipment. In addition, since open source ISA is supported, a user defined ISA can be flexibly used, and thus it is useful to develop a dedicated application specific integrated circuit (ASIC) for a special purpose without royalty.

For example, in developing communication equipment, when a special-purpose computation such as Fast Fourier Transform (FFT)/Inverse Fast Fourier Transform (IFFT) computation is implemented using a general-purpose processor, a lot of development time is required and a processing speed is slow, and thus it is common to use a custom-made chip (ASIC) configured to process these special-purpose computations in hardware. However, such an ASIC requires a lot of cost and long development time. Furthermore, after completing the ASIC development, if logic of the special-purpose part needs to be partially changed or additional functions are to be added, a new version of the ASIC needs to be redeveloped, resulting in problems that modification or improvement is difficult.

Accordingly, in order to solve some of these problems, a method of interlocking a separate chip capable of modifying computational logic if necessary such as an FPGA with a general-purpose processor has appeared.

FIG. 1 shows a conventional configuration in which a general-purpose processor is interlocked with an FPGA chip having logic for computation according to a special purpose.

As shown in FIG. 1, a method of interlocking a general-purpose processor chipset 1 and an FPGA chipset 2 implemented with special-purpose functions through a bus structure is general. The general-purpose processor chipset 1 operates by requesting a desired computation execution to the FPGA chipset 2 through a bus structure and receiving the result. Therefore, the processor chipset 1 communicates with the FPGA chipset 2 using a bus-structured high-speed interface, and this high-speed interface structure uses a high-speed serial communication protocol rather than a simple connection. In this case, since the processor chipset 1 usually has a complex hierarchical structure such as a hardware layer, a virtualization layer, a driver layer, and an application layer (for example, in the case of a peripheral component interconnect express (PCI express) structure, which is a high-speed serial interface), and requests desired computations through the application layer and receives the result, the application of such a high-speed interface is difficult and complicated, and its speed is also slow, so its use is unsuitable as a computation device for the purpose of using a lot of high-speed computations.

In other words, since this method has many differences in speed and whether to use an extended ISA structure (program and method of performing computation) to replace the ASIC developed for the purpose of requiring high-speed computation, its performance is very low and the control is complicated, and as a result, ASIC needs to be developed with a lot of time and efforts.

When developing the ASIC in this way, even if a general-purpose processor is used, since an extended ISA and an extended computation unit in the development stage are designed and fixed in hardware, it is possible to provide a high-performance computation device suitable for a special purpose.

In Korean Patent Registration No. 10-1783576, "processor having multiple cores, shared core extension logic, and shared core extension utilization instructions", an ASIC configuration including a typical extended computation configuration is shown, an extended instruction set that is not supported by a general-purpose processor core is defined, and such an extension instruction set is to be performed through separately provided shared extension logic. To this end, complex development factors are included, such as adding a configuration for decoding an extended instruction to a general-purpose processor core part, configuring an interface for transmitting and receiving data with the shared extension logic, and then adding a configuration for managing shared extended memory synchronization.

Meanwhile, as in the method described through FIG. 1 above, in order to reduce the complexity of configuring the FPGAs on a separate chip and connecting the FPGAs to a chip-to-chip interface, a method of configuring a general-purpose processor as logic of FPGA using a combination logic block (CLB) as a logic configuration unit of the FPGA chipset and configuring an additional user request computing part as remaining FPGA logic or a method of configuring a special-purpose computing part required by the user as FPGA logic by using an FPGA chipset with a hardware general-purpose computing part.

FIG. 2 is an example of methods of configuring a general-purpose processor in an FPGA chipset.

FIG. 2A shows that a general-purpose processor is configured as a soft macro processor block 11 through an FPGA CLB inside an FPGA chipset 10, and this method has difficulty in speeding up the processor clock and has a problem in a cost increase due to the use of a large-capacity FPGA. FIG. 2B shows that a general-purpose processor function block is configured as a hard macro crosser block 21 inside an FPGA chipset 20 to speed up the processor clock.

However, the configurations shown in FIG. 2 are the same as the configuration of connecting the FPGA chip and the general-purpose processor chip in an interface structure as described above with reference to FIG. 1 except that the configurations are unified with one FPGA chipset.

That is, in the case of FIGS. 1 and 2, the FPGA and the processor have a structure of programming and controlling control signals according to a first applied interface protocol, and the processor may use only an instruction according to 'a basic ISA fixed from the original design'. In order to use an external FPGA chip, a communication program needs to be created using the basic ISA and then used, and thus it is inevitable to interlock with the external FPGA chip at an application level.

Therefore, this method may provide the variability of special-purpose functions by changing the FPGA logic when it is required to modify the configuration of the special-purpose computation logic to be used or add new functions. However, there are limitations such as speed limitation, increased program complexity, inability to control based on the processor clock, and difficulty in parallel processing due to the complicated control through the interface to perform special-purpose computations instead through an external module.

On the other hand, among these general-purpose processors, in the case of the RISC-V ISA structure capable of flexibly changing and applying the ISA, a special-purpose processor capable of performing desired functions at the ISA level after defining a user-defined instruction set may be relatively easily implemented. However, in this case, since an instruction decoding unit for applying the user-defined ISA and a computation unit for executing the corresponding user-defined instruction are designed and developed in ASIC, modifications such as changing an 'additional new user-defined ISA' configuration or changing a special-purpose computation algorithm are disabled during use.

As a result, the configuration using the existing FPGA chipset may provide variability to shorten a hardware chipset development time, but has problems in that due to the low performance and the indirect use of the FPGA chipset, there are many limitations in program development, and it is difficult to be used for applications requiring high-speed computations (for example, computation devices for high-speed communication devices). The configuration using RISC-V based ASIC added with an extended ISA requires a lot of time and efforts to be developed, and once configured ASICs has a problem in that the designed ISA or computation logic cannot be changed.

Therefore, there is an increasing need for a hardware high-speed computation combined RISC-V based computation device for supporting a new type of user-defined instruction set capable of providing high-performance special-purpose functions according to a user-defined ISA without changing separate hardware or developing the ASIC by adopting variably the user-defined ISA based on the RISC-V processor that supports a user-defined instruction set.

DISCLOSURE

Technical Problem

An object of the present invention to solve the problems is to provide a hardware high-speed computation combined RISC-V based computation device for supporting a user-defined instruction set and a method thereof as a single-chip computation device based on RISC-V ISA supporting a user-defined instruction set, which may arbitrarily change a changeable user-defined instruction set (user configurable ISA) and a special-purpose computation unit according thereto, easily implement a special-purpose computation device required in various fields requiring special-purpose functions including high-speed computation without ASIC development so as to perform a program according to the extended ISA by a processor internal core processing method, and change or add the computation logic of a special-purpose computation device that has already been developed, as well as to change or add a user-defined ISA at any time.

Another object of the present invention is to provide a hardware high-speed computation combined RISC-V based computation device for supporting a user-defined instruction set and a method thereof which applies an interlocking configuration for ISA extension and an FPGA unit for performing extension ISA to a computation device core, performs a special-purpose computation and an external IC control so as to be variably recorded and utilized by the FPGA unit, but at an ISA level by a variable FPGA unit by identifying a user-defined instruction set without changing a basic ISA computation unit having immutability that cannot be changed after configuration, and may selectively apply the result to a computation unit pipeline, thereby not only enabling a use of user-defined ISA through only configuration modification of the FPGA unit in a processor single chip, but also changing the user-defined ISA or special-purpose computation and the external IC control configuration itself at any time.

Yet another object of the present invention is to provide a hardware high-speed computation combined RISC-V based computation device for supporting a user-defined instruction set and a method thereof as a single chip configuration based on an RISC-V processor which may define and perform an extended ISA and a corresponding computation and external IC control configuration by an FPGA unit to change a dedicated computation device configuration suitable for various special purposes in software after completing the hardware configuration, thereby greatly improving versatility.

Technical Solution

According to an embodiment of the present invention, a hardware high-speed computation combined RISC-V based computation device for supporting a user-defined instruction set comprises an RISC-V processor unit for performing RISC-V basic instructions having a pipeline structure including instruction fetch, instruction decoding, instruction execution, memory access, and write back stages, and an FPGA unit configured to perform a computation or external input/output control for a user-defined instruction set, wherein the RISC-V processor unit includes an ISA determination unit that selects the fetched instruction which is not the RISC-V basic instruction, and an FPGA forwarding unit that forwards the instruction selected from the ISA determination unit to the FPGA unit, receives result information including interlocking information for a stage to which result information is to be provided, and provides the corresponding result to the stage defined in the interlocking information, and the FPGA unit includes an FPGA core interface unit which decodes an instruction to be transmitted from the FPGA forwarding unit to confirm whether the instruction is a user-defined instruction and performs the process when the instruction is the user-defined instruction, receives a result thereof, and includes interlocking information and then the result to the FPGA forwarding unit, and an FPGA function unit which performs a computation or external input/output control according to the user-defined instruction decoded by the FPGA core interface unit, and designates a stage to which the result and the corresponding result are to be provided to provide the designated stage to the FPGA core interface.

As an example, the ISA discrimination unit and the FPGA forwarding unit cannot be modified.

As an example, the FPGA unit may be configured to reconfigure the contents of the FPGA core interface unit and the FPGA function unit by a binary file for fusing the FPGA unit.

As an example, the FGPA forwarding unit may provide a user-defined instruction provided by the ISA determination unit to the FPGA unit and receive a result thereof to provide the result to one of instruction decoding, instruction execution, memory access, and rewrite stages according to interlocking information, wherein the FGPA forwarding unit may operate according to a clock of the RISC-V processor unit.

As an example, the FPGA forwarding unit may perform parallel processing of the user-defined instructions according to a clock depending on a parallel pipeline structure.

As an example, the RISC-V processor unit and the FPGA unit may be configured in singular or plural, respectively.

According to another embodiment of the present invention, a hardware high-speed computation combined RISC-V based computing method for supporting a user-defined instruction set comprising an RISC-V processor unit for performing RISC-V basic instructions having a pipeline structure including instruction fetch, instruction decoding, instruction execution, memory access, and write back stages, and an FPGA unit configured to perform a computation or external input/output control for a user-defined instruction set, the method comprising the steps of fetching, by the RISC-V processor unit, instructions on a program memory through the instruction fetch stage, distinguishing, by the RISC-V processor unit, whether the corresponding instruction is not an RISC-V basic instruction in the instruction fetching step to transmit the corresponding distinguished instruction to the FPGA unit, decoding, by the FPGA unit receiving the distinguished instruction, the corresponding instruction to determine whether the instruction is a user-defined instruction, performing a corresponding computation or external input/output interface control in the case of the user-defined instruction, generating a result thereof, and then providing interlocking information specifying a stage of the RISC-V processor unit to which the corresponding result is to be provided and the generated result to the RISC-V processor unit, and providing, by the RISC-V processor unit, the received generation result to a corresponding state according to the interlocking information.

As an example, the RISC-V processor unit may be fixedly configured to be non-modifiable, and the configuration of the FPGA unit may be modified by a binary file for fusing.

The method may further comprise a fusing step of re-configuring the FPGA unit using a binary file for the FPGA unit.

As an example, the method may comprise providing, by the RISC-V processor unit, a result for the user-defined instruction to the FPGA unit, and receiving a result thereof to provide the result to one of instruction decoding, instruction execution, memory access, and rewrite stages according to interlocking information, wherein this process is performed by an ISA processing method according to a clock.

Advantageous Effects

According to the embodiment of the present invention, the hardware high-speed computation combined RISC-V based computation device for supporting the user-defined instruction set and the method thereof have effects of not only reducing ASIC development time and costs but also easily utilizing a high-performance special-purpose computation device suitable for a purpose and easily changing if necessary by configuring a single-chip computation device based on RISC-V ISA supporting a user-defined instruction set, arbitrarily changing a changeable user-defined instruction set and a special-purpose computation unit according thereto, easily implementing a special-purpose computation device required in various fields requiring special-purpose functions including high-speed computation without ASIC development so as to perform a program according to the extended ISA by a processor internal core processing method, and changing or adding the computation logic of a special-purpose computation device that has already been developed, as well as changing or adding a user-defined ISA at any time.

Further, the present invention has effects of satisfying development convenience, ease of use and scalability by applying an interlocking configuration for ISA extension and an FPGA unit for performing extension ISA to a computation device core, performing a special-purpose computation and an external IC control so as to be variably recorded and utilized by the FPGA unit, but at an ISA level by a variable FPGA unit by identifying a user-defined instruction set without changing a basic ISA computation unit having immutability that cannot be changed after configuration, and selectively applying the result to a computation unit pipeline, thereby not only enabling a use of user-defined ISA through only configuration modification of the FPGA unit in a processor single chip, but also changing the user-defined ISA or special-purpose computation and the external IC control configuration itself at any time.

Furthermore, the present invention has an effect of enabling hardware function enhancement including ISA changing during use by not only providing a single chip with high versatility that can be converted to a special-purpose computation device with functions similar to ASICs at low cost, but also performing a change in user-defined ISA and a change in its functions through a process similar to updating firmware.

MODES OF THE INVENTION

Figure 1:
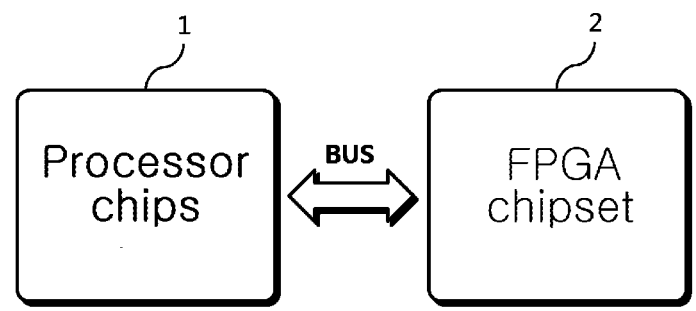
FIG. 1 is a block diagram showing an interlocking scheme of a general processor chipset and an FPGA chipset.
Figure 2:
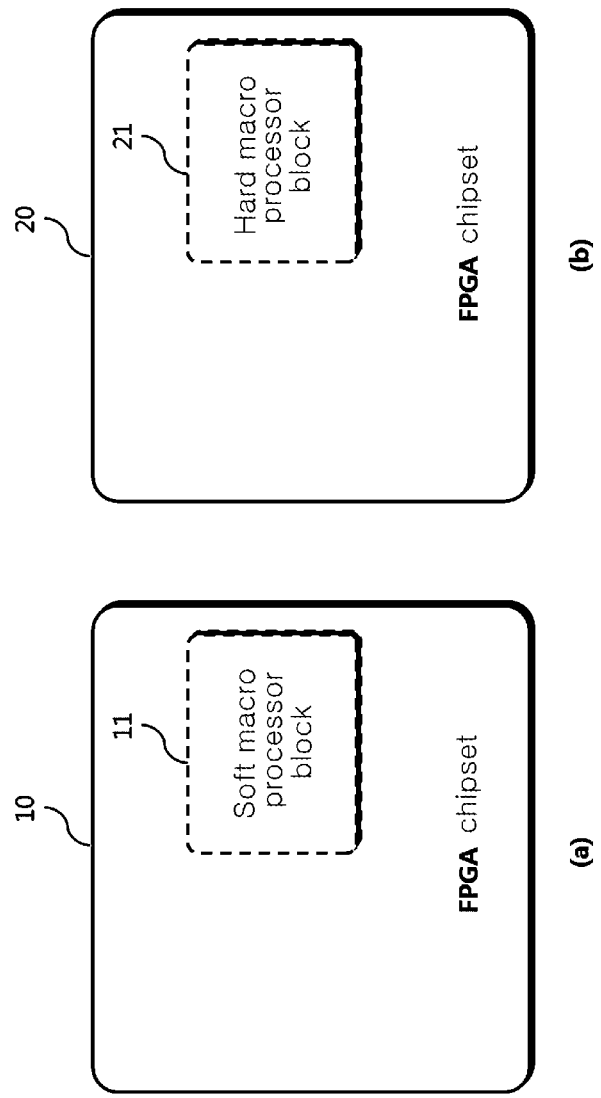
FIG. 2 is an exemplary diagram of a configuration in which a processor block is applied in an FPGA chipset.

It is noted that technical terms used in the present invention are used to just describe a specific embodiment and do not intend to limit the present invention. Further, unless the technical terms used in the present invention are particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that cannot accurately express the spirit of the present invention, the technical term is substituted by a technical term which can correctly appreciated by those skilled in the art to be appreciated. In addition, a general term used in the present invention should be interpreted as defined in a dictionary or contextually, and should not be interpreted as an excessively reduced meaning.

Moreover, if singular expression used in the present invention is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second' used in the present invention can be used to describe various components, but the components should not be limited by the terms. The terms are used only for distinguishing one component from the other component. For example, a first component may be named as a second component and similarly, the second component may also be named as the first component without departing from the scope of the present invention.

Hereinafter, preferred embodiments according to the present invention will be described in detail with reference to the accompanying drawings, and like or similar components are denoted by the same reference numerals regardless of a sign of the drawing, and duplicated description thereof will be omitted.

In describing the present invention, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present invention and it should not be analyzed that the spirit of the present invention is limited by the accompanying drawings.

In particular, embodiments of the present invention describe a user-defined ISA application configuration according to an embodiment of the present invention based on an RISC-V processor core part. Therefore, the terms of a processor and a computation device are used interchangeably, wherein the processor means a basic computing system having an RSIC-V basic configuration, and the computation device may be considered as a term encompassing an extended processor that supports a user-defined ISA by transforming such an existing processor structure. Furthermore, an instruction set architecture (ISA) refers to an instruction corresponding to a machine language as an instruction set structure, and the instruction set or the ISA may be considered as the same meaning.

Hereinafter, embodiments of the present invention will be described with reference to FIGS. 4 to 12.

Figure 3:
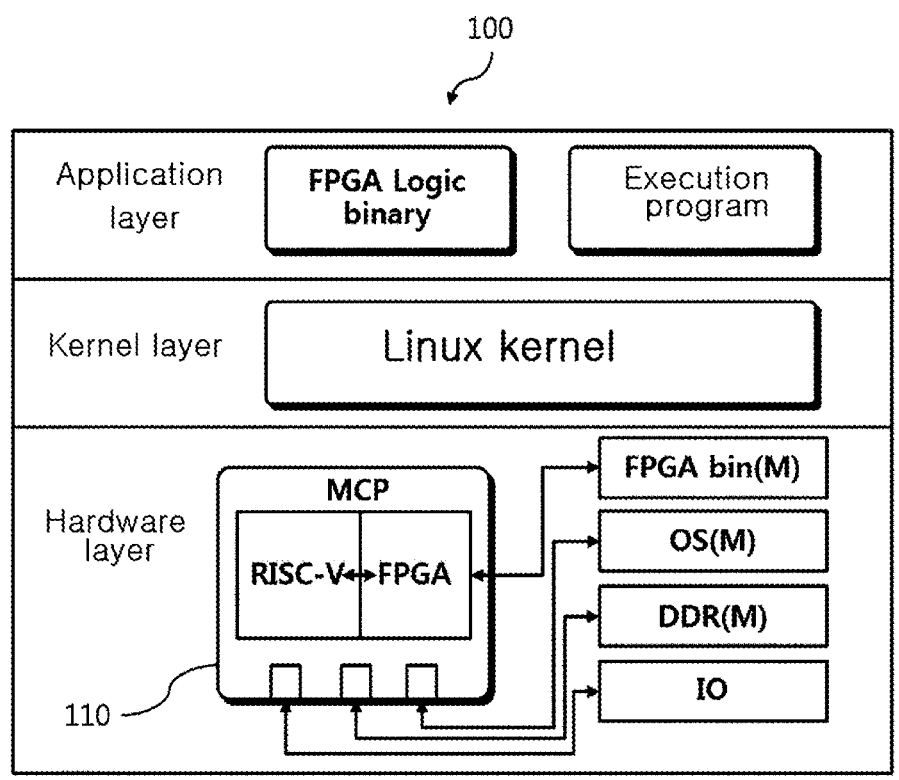
FIG. 3 is a schematic view of a hierarchical configuration of a computing system using a hardware high-speed computation combined RISC-V based computation device for supporting a user-defined instruction set according to an embodiment of the present invention.

First, FIG. 3 is a schematic view of a hierarchical configuration of a computing system 100 using a hardware high-speed computation combined RISC-V based computation device for supporting a user-defined instruction set according to an embodiment of the present invention. As shown in FIG. 3, an embodiment of the present invention uses a multi-chip package (MCP) type of computation device 110 with a plurality of semiconductor dies included in a single package configured by an extended ISA method of performing instructions according to a processor clock at an instruction set architecture (ISA) level for a processor operation, instead of a method of configuring an RISC-V processor unit and an FPGA unit in one chipset, requesting a computation in an application layer through an interface protocol between the individual devices, and receiving the result thereof. The computation device 110 may be configured in the form of a single chip.

Such a computing device 110 is provided to interlock between a plurality of memories (a memory OS(M) in which an operating system is stored, and a main RAM memory (DDR(M)) for a program operation) and an external input/output device (IO) through an external input/output interface. An FPGA unit, which is configured therein to perform computation or external input/output control corresponding thereto with an user-defined ISA, may be variably set in configuration through a separate flash memory FPGA bin (M) in which a binary file defining an internal logic configuration is stored. Although not shown, an FPGA fusing unit for this may be configured inside or outside the corresponding computation device 110.

When an operating system (for example, a Linux-based operating system) operates on a single-chip type computation device 110, a Linux kernel exists on a hardware layer thereof, and FPGA logic binary files defining the configuration of the FPGA and an execution program for operating the corresponding computation device 110 exist as an application layer on an upper layer thereof.

The execution program may be configured to use the user-defined ISA extended through the FPGA at the same level as a basic ISA of the processor, and may be compiled based on the extended ISA including the user-defined ISA.

Figure 4:
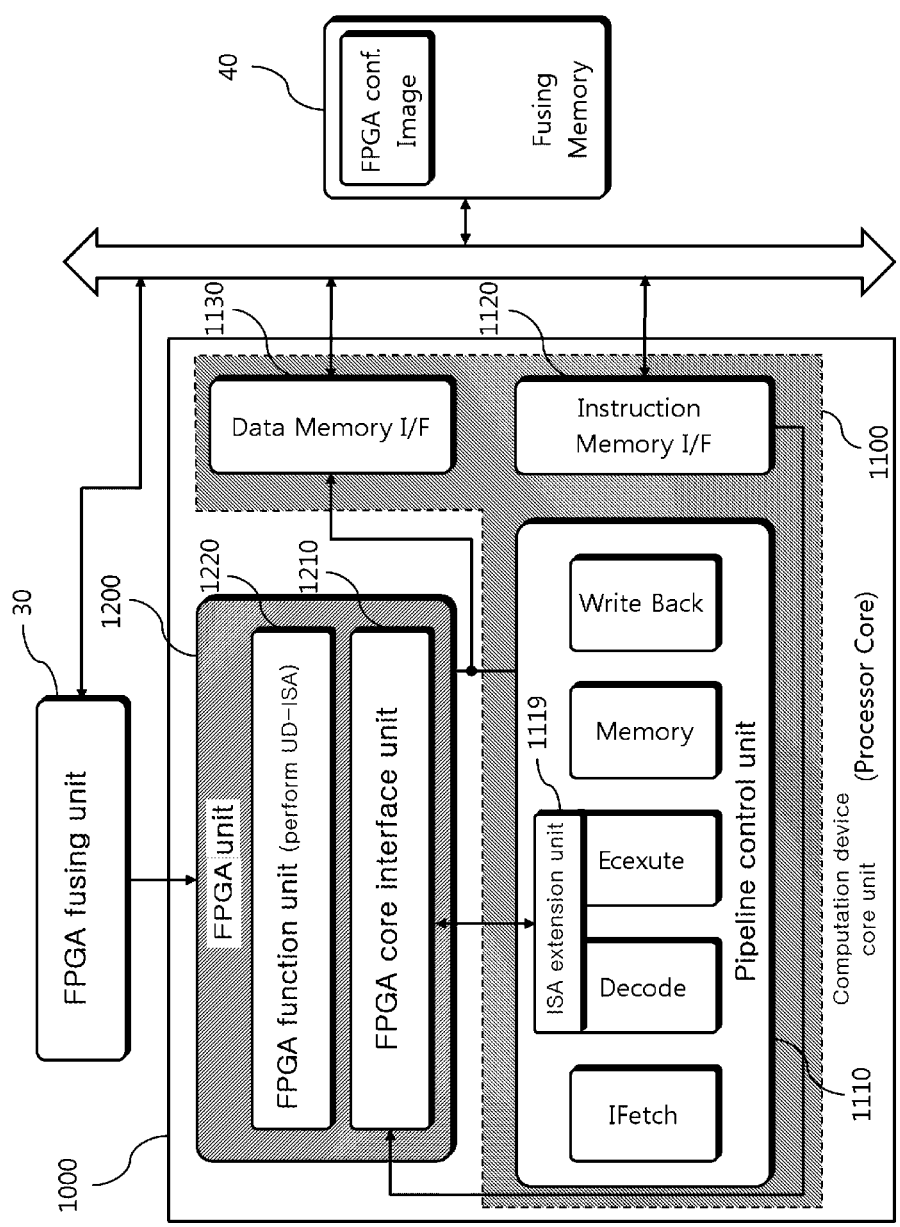
FIG. 4 is a block diagram of a configuration of a system using a hardware high-speed computation combined RISC-V based computation device for supporting a user-defined instruction set according to an embodiment of the present invention.

FIG. 4 is a block diagram of a configuration of a system using a hardware high-speed computation combined RISC-V based computation device 1000 for supporting a user-defined instruction set according to an embodiment of the present invention. The computation device 1000 according to the embodiment of the present invention has a basic RISC-V processor configuration as shown in FIG. 4 and includes an FPGA unit 1200 for performing a user-defined ISA, and an RISC-V processor unit 1100 in which an ISA extension unit 1119 for interlocking is configured.

The RISC-V processor unit 1100 is fixed and corresponds to a processor block configured in a hard macro manner that cannot be changed if once configured. Accordingly, various user-defined ISAs and configurations for special-purpose computation or external input/output control corresponding thereto are variably configured in the FPGA unit 1200, and the RISC-V processor unit 1100 according to the embodiment of the present invention is a fixed configuration for associating the configurations, and the ISA extension unit 1119 is further configured in an existing basic RISC-V processor block.

Although the FPGA unit 1200 is configured to be separated from the RISC-V processor unit 1100, the FPGA unit 1200 actually operates as a part of a pipeline structure for fetching, decoding, and performing an ISA according to the clock of the RISC-V processor. The operation of the FPGA unit 1200 is very fast, and in the process of executing the compiled program, the FPGA unit 1200 operates with an internal ISA processing method, not with a separate external device interface method.

On the other hand, actually, a configuration for defining a user-defined ISA and decoding the user-defined ISA, a configuration for performing the decoded user-defined instruction, and a configuration of determining whether the result thereof are provided to any pipeline stage of the RISC-V processor unit 1100 (a device constituting the corresponding stage) are variably defined in the FPGA unit 1200.

The FPGA unit 1200 includes an FPGA core interface unit 1210 which receives a user-defined instruction from the ISA extension unit 1119 of the RISC-V processor unit 1100 and decodes the user-defined instruction to confirm whether it is a user-defined instruction, executes the corresponding instruction, and then receives the result thereof, and provides to the ISA extension unit 1119 result information including interlocking information for a stage to be provided with the corresponding result and the result information, and an FPGA function unit 1220 which performs a computation or external input/output control according to the user-defined instruction decoded in the FPGA core interface unit and designates the result thereof and a stage to be provided to the FPGA core interface.

Here, the FPGA core interface unit 1210 and the ISA extension unit 1119 may be configured to directly exchange information through internal connection.

Furthermore, the configuration of the FPGA unit 1200 may be initially set or changed as necessary to the contents of a memory 400 which stores an FPGA defined image (binary information for FPGA fusing) defining the configuration of the corresponding FPGA unit 1200 through the FPGA fusing unit 30 configured separately from the computation device 1000. The configuration for such fusing may be omitted if made only once when the computation device 1000 is manufactured, but is configured in the computation device 1000 to be used when a system including the corresponding computation device 1000 is initially drive or may be used to change the configuration of the FPGA unit 1200 using a new FPGA defined image when there is a need to improve functions such as changing functions during usage or adding the user-defined ISA. Therefore, it is possible to change and improve the hardware function and performance itself of the processor through 'a new processor structure change with a new ISA suitable for a specific purpose' through a method similar to the existing firmware update that changes only the software configuration, not the hardware configuration.

Typically, a basic configuration of the RISC-V processor includes an instruction memory interface 1120, a data memory interface 1130, and a pipeline component 1110, which are included in the illustrated RISC-V processor unit 1200.

In the illustrated pipeline component 1110, a five-stage pipeline structure of RISC-V is simply expressed, but is configured to enable parallel processing while performing instruction fetching, instruction decoding, instruction execution, memory access, and write back stages sequentially.

Meanwhile, the RISC-V processor unit 1100 and the FPGA unit 1200 may each be configured singly or multiply, and the multi-core RISC-V processor unit 1100 may interlock with one FPGA unit 1200, one RISC-V processor unit 1100 may interlock with the plurality of FPGA units 1200, and the multi-core RISC-V processor unit 1100 may interlock with the plurality of FPGA units 1200.

Figure 5:
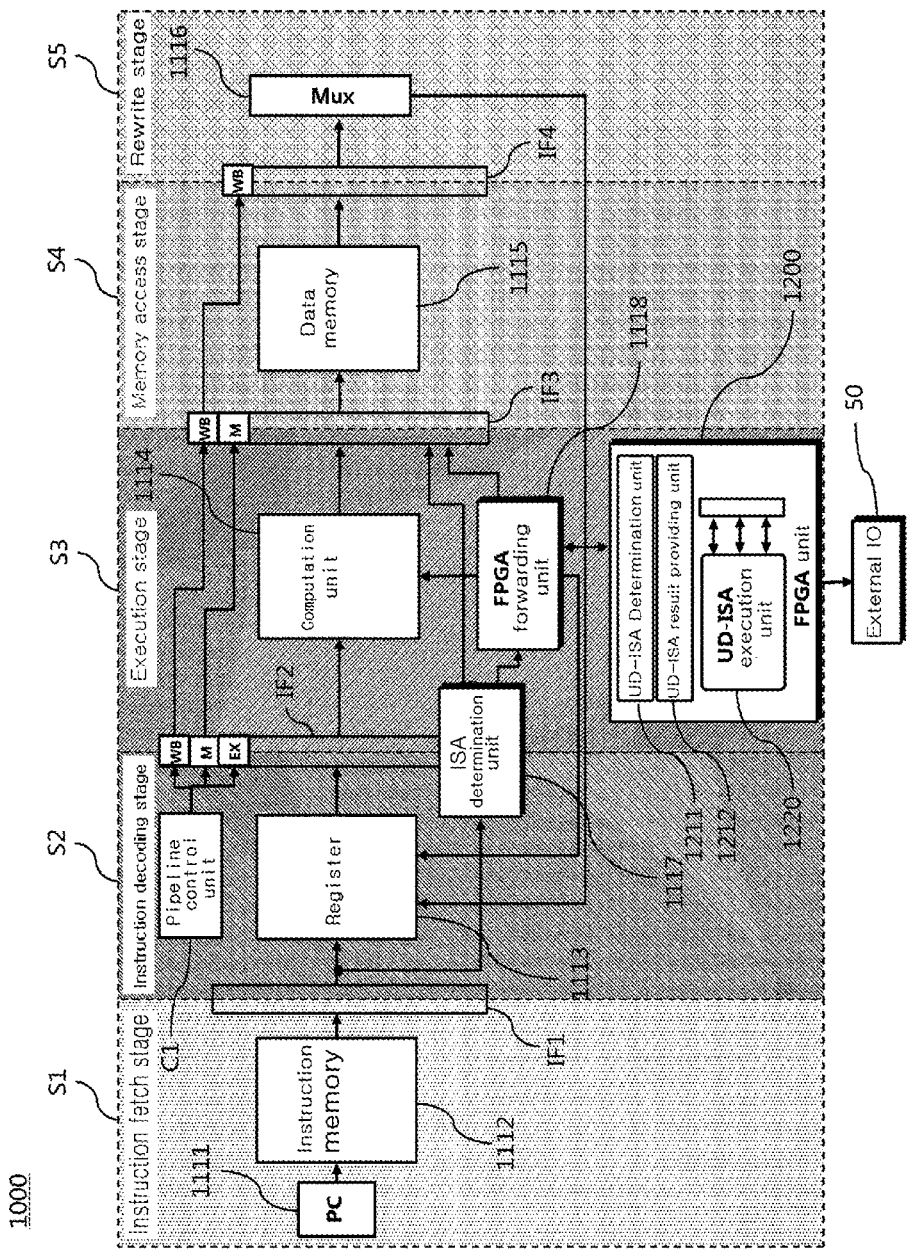
FIG. 5 is a stage-based configuration diagram of a hardware high-speed computation combined RISC-V based computation device for supporting a user-defined instruction set according to an embodiment of the present invention.

FIG. 5 is a stage-based configuration diagram of a hardware high-speed computation combined RISC-V based computation device for supporting a user-defined instruction set according to an embodiment of the present invention.

As illustrated in FIG. 5, the computation device includes a program counter 1111 that specifies an address of an instruction memory to be executed, an instruction memory 1112 storing instructions of a program, a register 1113 that decodes the fetched instructions, stores necessary information, and records a status, a computation unit 1114 including an arithmetic logic unit (ALU) for performing arithmetic and logical operations, a data memory 1115 for storing execution data in the processor, and a MUX 1116 to selectively write the result to the register 1113 for rewriting, and includes a plurality of pipelines IF1 to IF4 to parallel processing and a pipeline control unit C1 controlling a flow thereof.

Using this configuration, the RISC-V processor sequentially executes an instruction fetch stage (S1), an instruction decoding stage (S2), an execution stage (S3), a memory access stage (S4), and a rewriting stage (S5). Typically, since the RISC-V basic instruction processes one stage during one clock period, five different tasks may be processed in parallel at each stage through the pipeline structure.

In the embodiment of the present invention, a user-defined instruction set may be arbitrarily configured and used, and the execution according to the user-defined instruction set is used through a variable configuration, and after configuration, the user-defined instruction set and the execution configuration may be arbitrarily changed.

In order to support these user-defined instructions, a configuration for decoding and performing the user-defined instructions is implemented as part of the execution stage (S3) through the FPGA unit 1200, and in the RISC-V processor unit that cannot be changed if once configured, an ISA extension unit is fixedly configured to interlock with the user-defined instruction set configured in the FPGA unit 1200.

As illustrated in FIG. 5, the ISA extension unit includes an ISA determination unit 1117 that selects the fetched instruction which is not the RISC-V basic instruction, and an FPGA forwarding unit 1118 that forwards the instruction selected from the ISA determination unit 1117 to the FPGA unit 1200, receives result information including interlocking information for a stage to which result information is to be provided, and provides the corresponding result to the stage defined in the interlocking information.

That is, the ISA determination unit 1117 configured in the RISC-V processor unit 1100 that cannot know which user-defined instruction is newly defined and cannot be changed if once configured, includes information about the basic RISC-V ISA and is configured to be simplified to provide the corresponding instruction to the FPGA forwarding unit 1118 only when the instruction fetched in the instruction memory 1112 is not the instruction included in the basic RISC-V ISA.

Since the FPGA forwarding unit 1118 also has a fixed configuration that cannot change its configuration, only an operation rule processing part according to a kind of criterion may be implemented by providing user-defined instructions (all other than the basic RISC-V ISA) provided by the ISA determination unit 1117 to the FPGA unit 1200, receiving a result thereof, and providing the result to one of instruction decoding, instruction execution, memory access, and write back according to the interlocking information. Furthermore, the FPGA forwarding unit 1118 is a part of the RISC-V processor unit, and operates according to a processor clock, and accordingly, may process user-defined instructions in parallel with a parallel pipeline structure.

However, in the case of a user-defined instruction, the FPGA forwarding unit 1118 provides the corresponding instruction to the FPGA unit 1200 and receives the result, wherein this process may be performed within one clock period, or may be performed when multiple clock periods are required.

The illustrated FPGA unit 1200 includes an FPGA core interface unit 1210, and the FPGA core interface unit 1210 may include a user-defined ISA determination unit 1211 which decodes an instruction to be transmitted from the FPGA forwarding unit 1118 to confirm whether the instruction is a user-defined instruction and performs the process when the instruction is a user-defined instruction by the FPGA function unit 1220 (substantially, a user-defined ISA performing unit) and a user-defined ISA result providing unit 1212 which receives a computation result or an external input/output control result performed by the FPGA function unit 1220 to provide the received result including interlocking information to the FPGA forwarding unit 1118.

The FPGA function unit 1220 may perform the computation or external input/output control according to a user-defined instruction decoded by the user-defined ISA determination unit 1211, and designates a stage to which the result and the corresponding result are to be provided to transmit the designated stage to the user-defined ISA result providing unit 1212. For example, interlocking information may be designated by providing the computation result to the computation unit 1114, writing the computation result to the data memory 1115, or providing the computation result to the MUX 1116 of the rewrite stage in order to write it back to the register 1113.

As a result, the FPGA unit 1200 decodes a substantial user-defined instruction set, performs a special-purpose function thereof, and provides the result, but acts as an ISA to determine which stage the result is provided. Therefore, in the embodiment of the present invention, the user-defined instruction set may be flexibly applied through the modification of the variable FPGA unit 1200.

Figure 6:
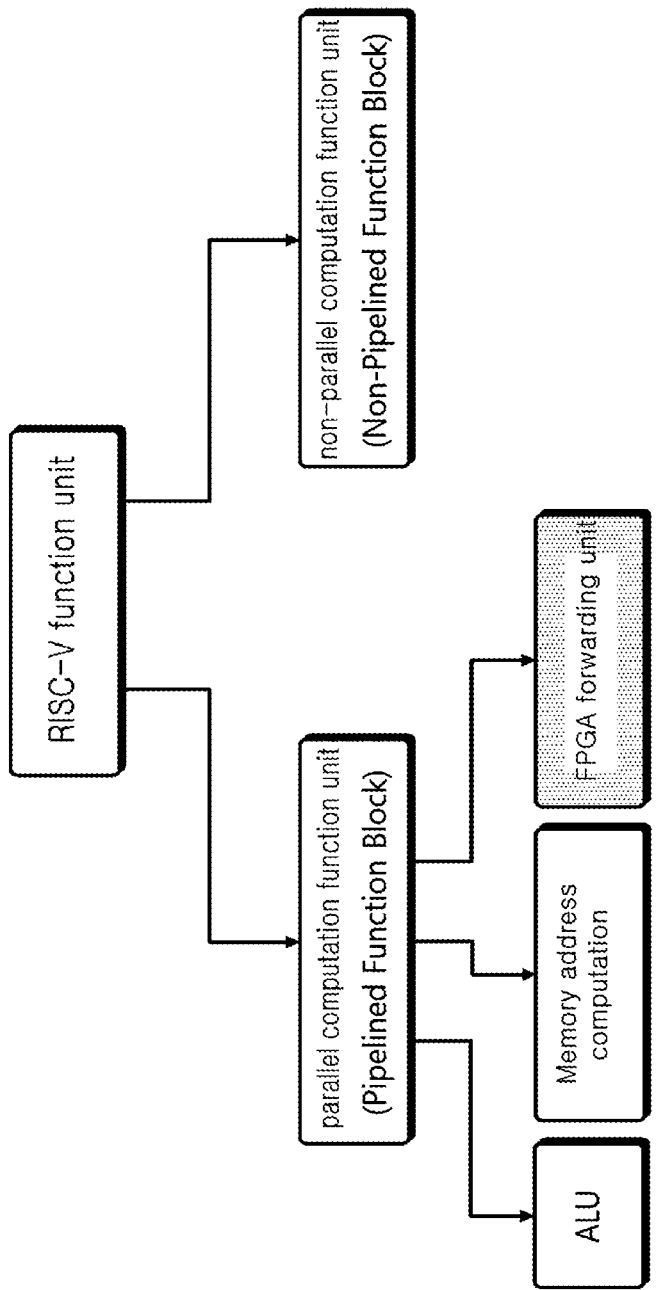
FIG. 6 is a schematic view of describing a computing method of an FPGA forwarding unit in a hardware high-speed computation combined RISC-V based computation device for supporting a user-defined instruction set according to an embodiment of the present invention.

FIG. 6 is a schematic view of describing a computing method of an FPGA forwarding unit in a hardware high-speed computation combined RISC-V based computation device for supporting a user-defined instruction set according to an embodiment of the present invention. As shown in FIG. 6, in the case of the RISC-V function unit, parallel computation is supported through the pipeline structure. Of course, computations that require some external information or require result of previous execution result need to be processed as non-parallel computation, which include a non-parallel computation function unit, but the most of RSIC ISAs support parallel computations.

Therefore, the FPGA forwarding unit according to the embodiment of the present invention may also operate as a kind of parallel computation function unit, which operates in accordance with the processor clock at the ISA level, but actually, even if a separate FPGA unit to be separated is used, such a parallel processing configuration is enabled.

Figure 7:
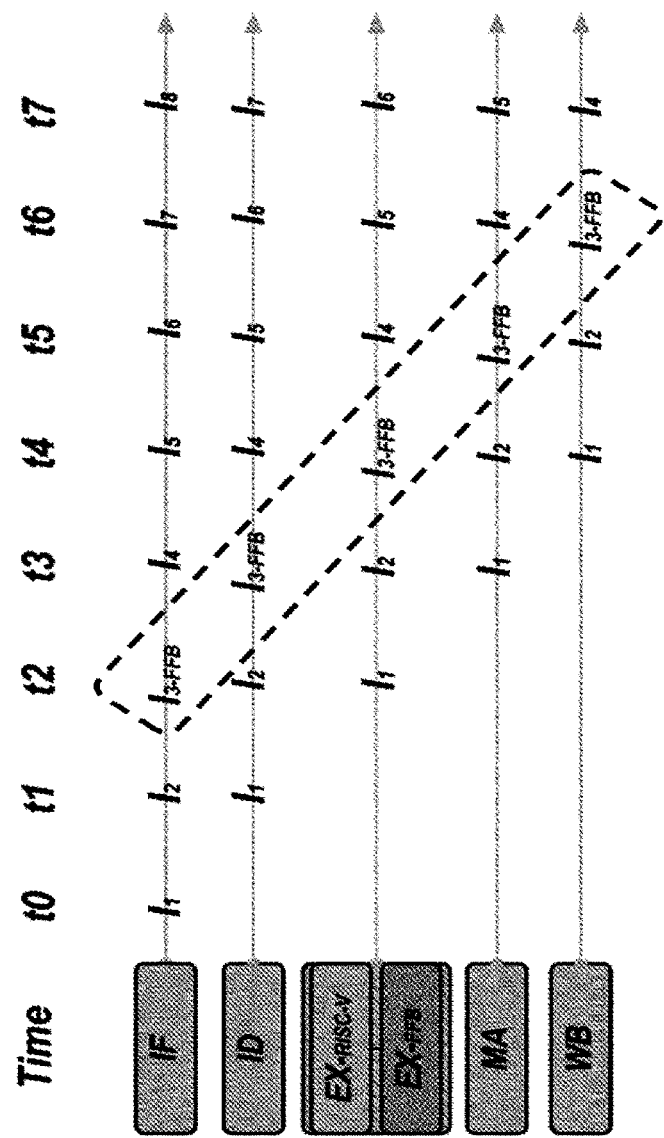
FIG. 7 is a schematic diagram of clock-based parallel processing for describing a parallel computation method of a user-defined instruction set according to an embodiment of the present invention.

FIG. 7 is a schematic diagram of clock-based parallel processing for describing a parallel computation method of a user-defined instruction set according to an embodiment of the present invention. As shown in FIG. 7, in the instruction fetch stage, a first instruction I1 is brought at an initial time point t0, the first instruction I1 fetched at the first time point t1 is decoded at the instruction decoding stage, and in the fetch stage, a second instruction I2 is brought at the corresponding time point. In the same manner, a third instruction I3-FFB fetched to the second time point t2 is a user-defined instruction, which is not determined as the basic RISC-V instruction through the ISA determination unit in the instruction decoding stage at a third time point t3 which is a next time point, and then at a fourth time point t4, the third instruction I3-FFB is provided to the FPGA unit through the FPGA forwarding unit rather than the RISC-V computation unit. If the FPGA unit has processed the corresponding third instruction I3-FFB within one clock, the third instruction I3-FFB is transmitted to a memory access stage through the FPGA forwarding unit at a next time, a fifth time point t5, and to the rewrite stage at a sixth time point t6.

Even if the user-defined instruction set is used as described above, the user-defined instruction may be processed in a parallel processing configuration of 5 stages using 5 pipelines. Of course, the processing of the FPGA unit may require multiple clock periods, but is processed in parallel through the FPGA forwarding unit regardless of the parallel processing of other basic RISC-V ISAs.

Figure 8:
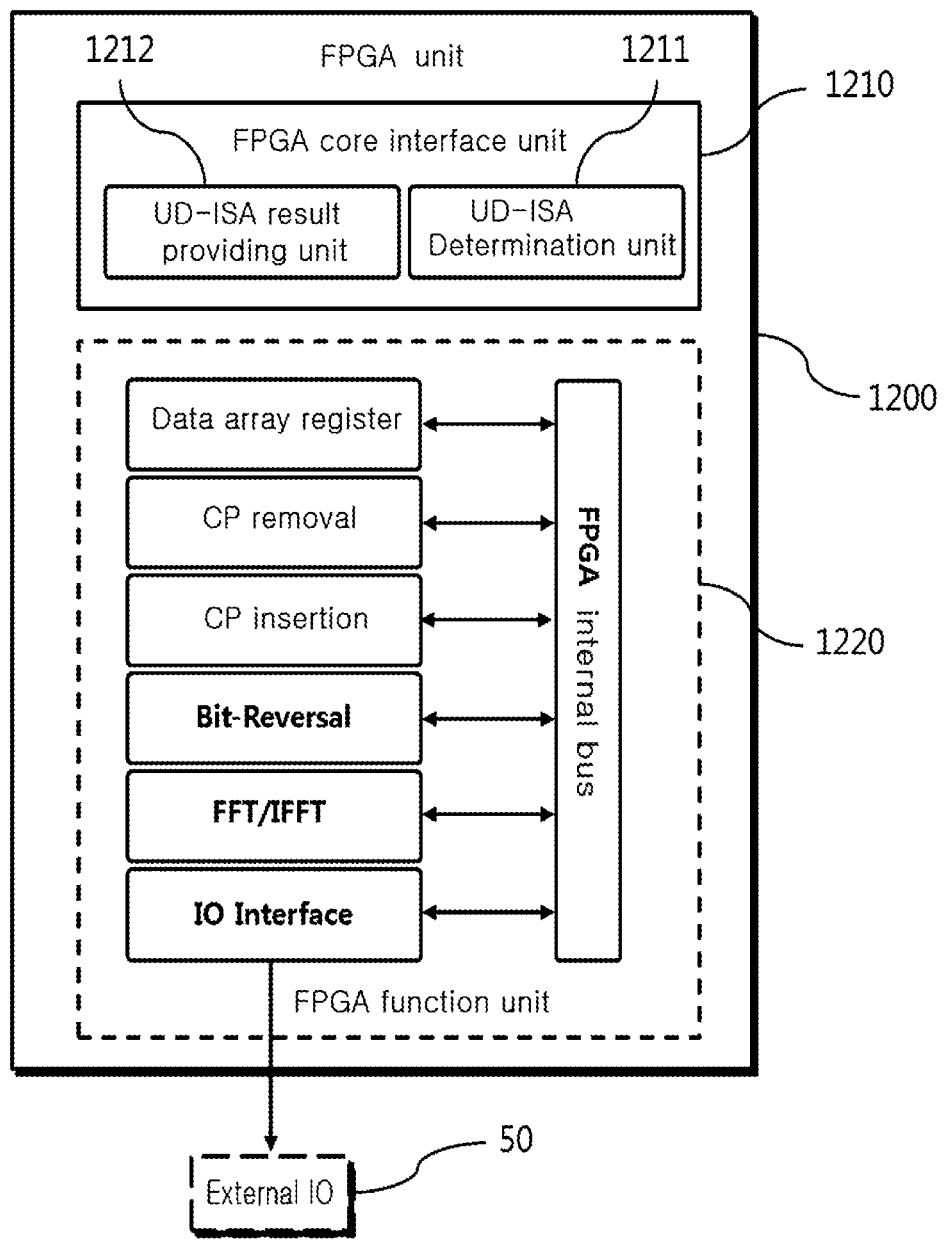
FIG. 8 is a configuration example of an FPGA unit according to an embodiment of the present invention.

FIG. 8 shows a configuration example of the FPGA unit 1220 according to an embodiment of the present invention. The FPGA unit 1200 is an example for providing a computation device including special-purpose user-defined instructions for application to wireless communication equipment.

The illustrated configuration may configure, in the FPGA unit 1220, a computation unit for removing a cyclic prefix, a computation unit for insertion of CP, a Bit Reversal computation unit for rearranging binary data bits, a Fast Fourier Transform)/IFFT(Inverse Fast Fourier Transform) computation unit, an input/output interface unit for setting control or checking information of an analog communication unit, and a data array register for temporarily storing the transmission and reception data, which are computations required in the corresponding wireless communication scheme for a special-purpose computation device to be applied to a wireless communication modem using orthogonal frequency division multiplexing (OFDM), for example, a long term evolution (LTE) modem. The FPGA unit 1220 may define a user-defined instruction set (e.g. call fft( ), call ifft( ), call cp_insert( ), call cp_remove( ), call bit_reversal( ), call io_fetch( ))) to perform these instructions, decode the user-defined instruction set by the user-defined IDA determination unit 1211 to execute the FPGA function unit 1220 corresponding to the corresponding instruction.

Figure 9:
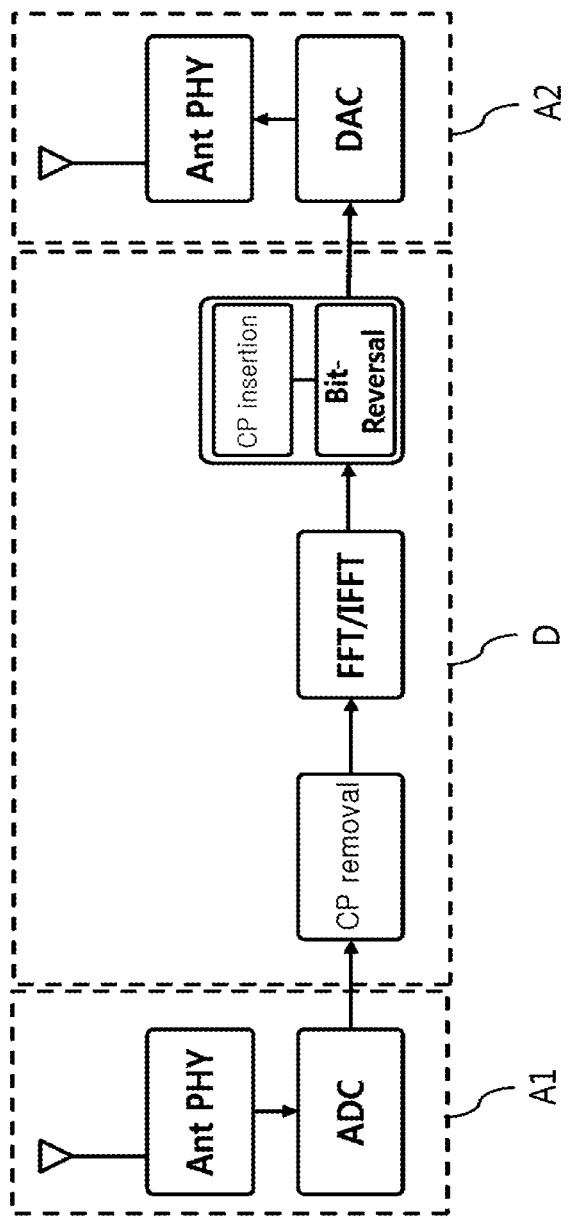
FIGS. 9 and 10 are a simplified configuration diagram of general communication equipment and a configuration diagram of applying the hardware high-speed computation combined RISC-V based computation device for supporting the user-defined instruction set according to an embodiment illustrated in FIG. 8 to the communication equipment of FIG. 9.
Figure 10:
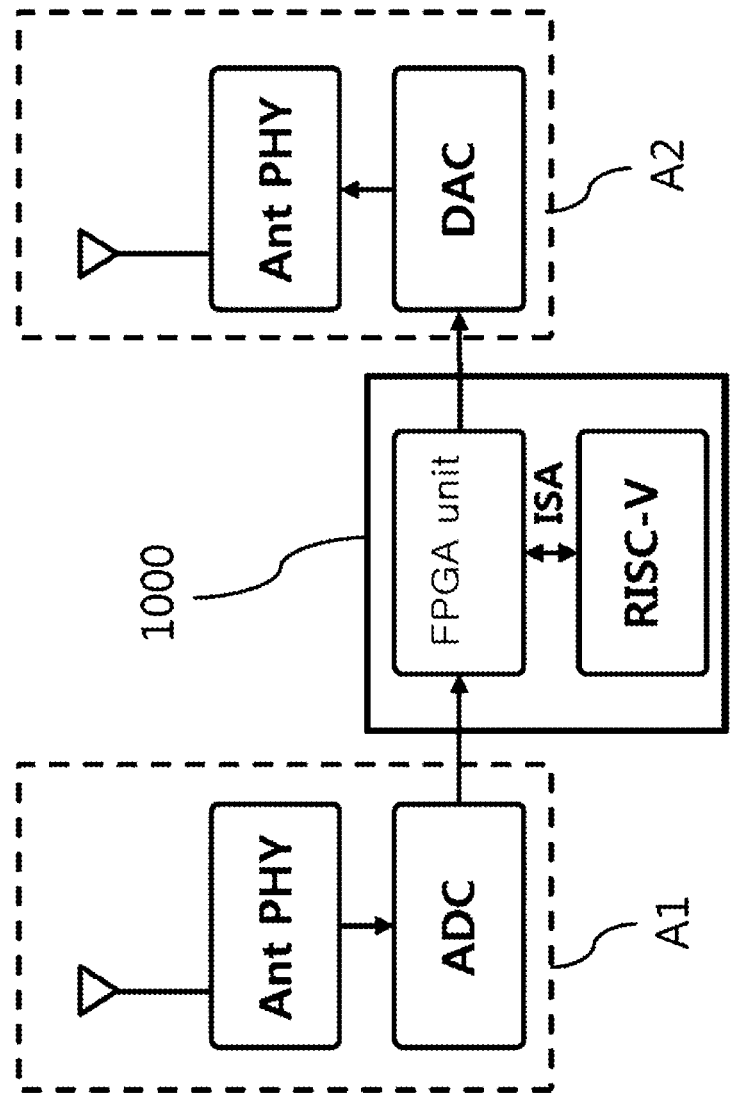

FIGS. 9 and 10 are a simplified configuration diagram of general communication equipment and a configuration diagram of applying the hardware high-speed computation combined RISC-V based computation device for supporting the user-defined instruction set according to an embodiment illustrated in FIG. 8 to the communication equipment of FIG. 9.

The configuration simplified and illustrated in FIG. 9 is a functional block diagram of an LTE modem, and as illustrated in FIG. 9, the configuration may include an analog block A1 including an analog-digital converter ADC that converts analog signals received through an antenna physical component Ant PHY into digital signals, a digital processing block D that receives the signal converted to the digital by the analog block A1 to remove the CP, performs FFT to check reception data, IFFT-computes the data to be transmitted, inserts the CP, and rearranges digital bit streams, and an analog block A2 including a digital-analog converter DAC that converts digital signals in which the CP is inserted and transmitted to analog signals and an antenna physical configuration unit Ant PHY transmitting the signals wirelessly.

If it is an existing configuration, in order to process the digital processing block (D), a general-purpose processor and a separate computation module for high-speed CP removal, CP addition, bit-reversal, and FFT/IFFT computation are configured and then interlocked and processed in a bus manner. In addition, and need to create a program routine that inefficiently performs this process through the limited RISC ISA of the general-purpose processor.

However, in the embodiment of the present invention, as shown in FIG. 10, by using the computation device 1000 according to the embodiment of the present invention for configuring in software (fusing the FPGA binary file for the purpose) the FPGA unit including a dedicated special-purpose computation function for the LTE modem shown in FIG. 8 and a user-defined ISA decoding unit supporting the special-purpose computation function as the ISA as a software is set in software, it is possible to provide the same effect as using a dedicated ASIC designed with an extended ISA structure for the LTE modem.

Figure 11:
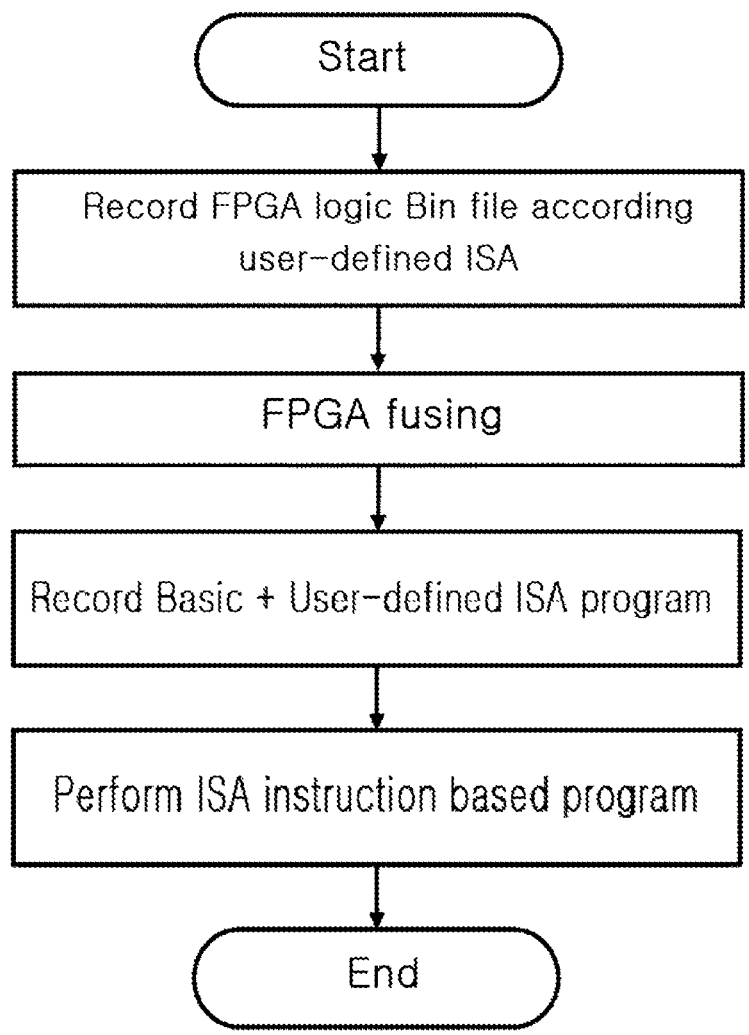
FIG. 11 is a flowchart showing a process of applying a special-purpose function in a hardware high-speed computation combined RISC-V based computation device for supporting a user-defined instruction set according to an embodiment of the present invention.

FIG. 11 is a flowchart showing a process of applying a special-purpose function in a hardware high-speed computation combined RISC-V based computation device for supporting a user-defined instruction set according to an embodiment of the present invention.

As shown in FIG. 11, first, a user-defined ISA and a computation and input/output control configuration corresponding to the user-defined ISA are developed with FPGA logic to generate a binary file to be applied to the FPGA unit, and then record the generated binary file in a memory to be referred during fusing.

A use preparation of an FPGA including a desired user-defined ISA and a computation and control function corresponding thereto is completed by fusing the binary file recorded in the memory to the FPGA, a program using the basic ISA and the user-defined ISA of RISC-V is created and then recorded in a main memory interlocking with the computation device.

Thereafter, when the corresponding computation device is executed, the program recorded in the main memory is read and then fetched and executed based on a program counter. The RISC-V ISA is computed through a traditional computation unit, and the user-defined instruction is processed by the FPGA unit through the FPGA forwarding unit.

Figure 12:
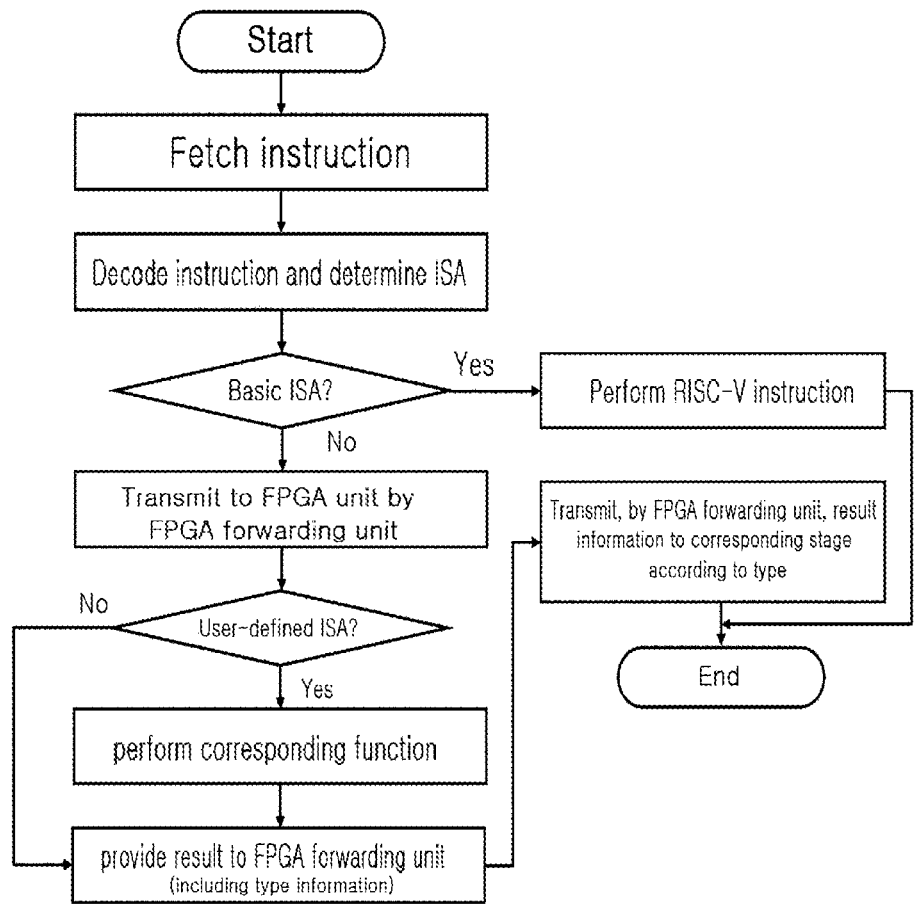
FIG. 12 is a flowchart showing a process of operating a hardware high-speed computation combined RISC-V based computation device for supporting a user-defined instruction set according to an embodiment of the present invention.

FIG. 12 is a flowchart showing a process of operating a hardware high-speed computation combined RISC-V based computation device for supporting a user-defined instruction set according to an embodiment of the present invention. As shown in FIG. 11, it is shown a process of performing a program (more specifically, compiled contents of the corresponding program) created using a RISC-V basic ISA and a user-defined ISA after the configuration of the user-defined ISA for special purposes and the FPGA unit for performing the user-defined ISA is completed.

As shown in FIG. 11, the RISC-V processor unit fetches instructions on the program memory through the instruction fetch stage.

In the step of fetching the instructions by the RISC-V processor, the ISA determination unit checks whether the corresponding instruction is the RISC-V basic instruction. If the instruction corresponds to the basic ISA, a traditional RISC-V instruction execution process of decoding and executing the instruction is performed.

If the instruction is not a basic ISA instruction, the corresponding instruction is transmitted to the FPGA unit through the FPGA forwarding unit. It is not yet clear whether the instruction is a user-defined instruction or an incorrectly input instruction.

As described above, the FPGA unit receiving the instruction through the FPGA forwarding unit decodes the instruction to determine whether the instruction is a user-defined instruction, performs a corresponding computation or external input/output interface control in the case of user instruction, generates the result, and provides interlocking information specifying a stage of the RISC-V processor unit to which the corresponding result is to be provided and the generated result to the RI_SC-V processor unit. If the instruction is not the user-defined instruction, result information informing the instruction may be provided to the FPGA forwarding unit.

The FPGA forwarding unit of the RISC-V processor unit provides the generated result to the corresponding stage according to the interlocking information according to the processor clock.

Therefore, according to the hardware high-speed computation combined RISC-V based computation device for supporting the user-defined instruction set according to the embodiment of the present invention, it is possible to provide a single chip with high versatility which is convertible into a dedicated special-purpose computation device having a function similar to an ASIC at low cost, and to improve hardware functions including ISA changes during use by allowing a change in user-defined ISA and changes in functions thereof through a process similar to firmware update.

The aforementioned contents can be corrected and modified by those skilled in the art without departing from the essential characteristics of the present invention. Accordingly, the various embodiments disclosed in the present invention are not intended to limit the technical spirit but describe the present invention and the technical spirit of the present invention is not limited by the following embodiments. The protection scope of the present invention should be construed based on the following appended claims and it should be appreciated that the technical spirit included within the scope equivalent to the claims belongs to the present invention.

What is claimed is:

1. A hardware high-speed computation combined RISC-V based computation device for supporting a user-defined instruction set comprising:
   an RISC-V processor unit for performing RISC-V basic instructions having a pipeline structure including instruction fetch, instruction decoding, instruction execution, memory access, and write back stages, and an FPGA unit configured to perform a computation or external input/output control for a user-defined instruction set,
   wherein the RISC-V processor unit includes:
   an ISA determination unit configured to selects an instruction, which is not an RISC-V basic instruction, from fetched instructions; and
   an FPGA forwarding unit configured to
   transmit the instruction selected by the ISA determination unit to the FPGA unit,
   receive interlocking information specifying a stage to which a result of the computation or external input/output control according to the instruction is to be provided, and
   provide the result of the computation or external input/output control according to the instruction to the stage specified in the interlocking information; and
   wherein the FPGA unit includes:
   an FPGA core interface unit configured to
   decode the instruction transmitted from the FPGA forwarding unit to check whether the instruction is a user-defined instruction,
   send the decoded instruction to an FPGA function unit when the instruction is the user-defined instruction,
   receive result information including the result of the computation or external input/output control according to the instruction and the interlocking information from the FPGA function unit, and
   send the result information to the FPGA forwarding unit; and
   the FPGA function unit, the FPGA function unit being configured to
   perform the computation or external input/output control according to the user-defined instruction decoded by the FPGA core interface unit,
   designate the stage to which the result of the computation or external input/output control is to be provided, and
   provide the FPGA core interface with the result information including the result of the computation or external input/output control and the interlocking information.

2. The hardware high-speed computation combined RISC-V based computation device for supporting a user-defined instruction set of claim 1, wherein the ISA discrimination unit and the FPGA forwarding unit are fixedly configured so as not to be modified.

3. The hardware high-speed computation combined RISC-V based computation device for supporting a user-defined instruction set of claim 1, wherein the FPGA unit is configured to reconfigure contents of the FPGA core interface unit and the FPGA function unit by a binary file for fusing the FPGA unit.

4. The hardware high-speed computation combined RISC-V based computation device for supporting a user-defined instruction set of claim 1, wherein the FGPA forwarding unit provides a user-defined instruction provided by the ISA determination unit to the FPGA unit and receives a result thereof to provide the result to one of instruction decoding, instruction execution, memory access, and rewrite stages according to interlocking information, wherein the FGPA forwarding unit operates according to a clock of the RISC-V processor unit.

5. The hardware high-speed computation combined RISC-V based computation device for supporting a user-defined instruction set of claim 4, wherein the FPGA forwarding unit performs parallel processing of the user-defined instruction set according to a clock depending on a parallel pipeline structure.

6. The hardware high-speed computation combined RISC-V based computation device for supporting a user-defined instruction set of claim 1, wherein the RISC-V processor unit and the FPGA unit are configured in singular or plural, respectively.

7. A hardware high-speed computation combined RISC-V based computing method for supporting a user-defined instruction set comprising an RISC-V processor unit for performing RISC-V basic instructions having a pipeline structure including instruction fetch, instruction decoding, instruction execution, memory access, and write back stages, and an FPGA unit configured to perform a computation or external input/output control for a user-defined instruction set, the method comprising the steps:
   fetching, by the RISC-V processor unit, instructions of a program memory through the instruction fetch stage;
   distinguishing, by the RISC-V processor unit, whether an instruction selected from the fetched instructions is not an RISC-V basic instruction and transmitting the distinguished instruction to the FPGA unit;
   decoding, by the FPGA unit receiving the distinguished instruction, the distinguished instruction to determine whether the distinguished instruction is a user-defined instruction;
   based on determining that the distinguished instruction is a user-defined instruction, performing a computation or external input/output interface control;
   generating a result of the computation or external input/output interface control;
   providing, to the RISC-V processor unit, the generated result and interlocking information specifying a stage of the RISC-V processor unit to which the generated result is to be provided; and
   providing, by the RISC-V processor unit, the generated result to the specified stage according to the interlocking information.

8. The hardware high-speed computation combined RISC-V based computing method for supporting a user-defined instruction set of claim 7, wherein the RISC-V processor unit is fixedly configured to be non-modifiable, and the configuration of the FPGA unit is modified by a binary file for fusing.

9. The hardware high-speed computation combined RISC-V based computing method for supporting a user-defined instruction set of claim 8, further comprising:
   a fusing step of re-configuring the FPGA unit using a binary file for the FPGA unit.

10. The hardware high-speed computation combined RISC-V based computing method for supporting a user-defined instruction set of claim 7:
  wherein the providing, by the RISC-V processor unit, the generated result to the specified stage according to the interlocking information includes performing an ISA processing method according to a clock.

* * * * *